(No Model.) 2 Sheets—Sheet 2.
J. W. RHODES.
BAND CUTTER AND FEEDER FOR THRASHING MACHINES.
No. 517,887. Patented Apr. 10, 1894.
Fig. 3.
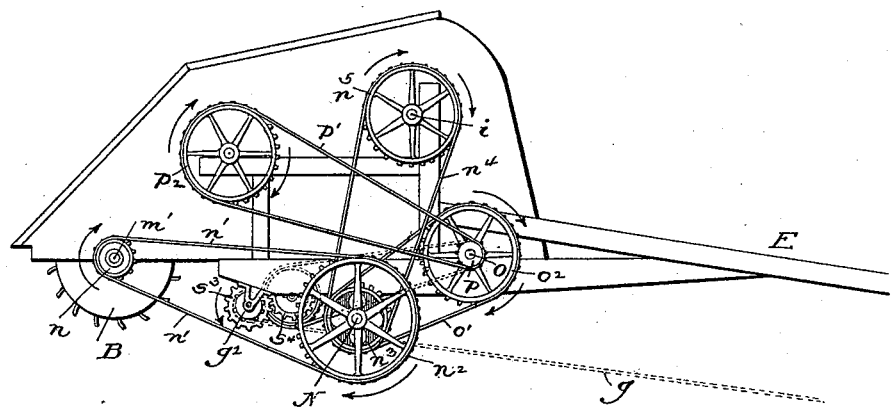
Fig. 4.
on line 4-4
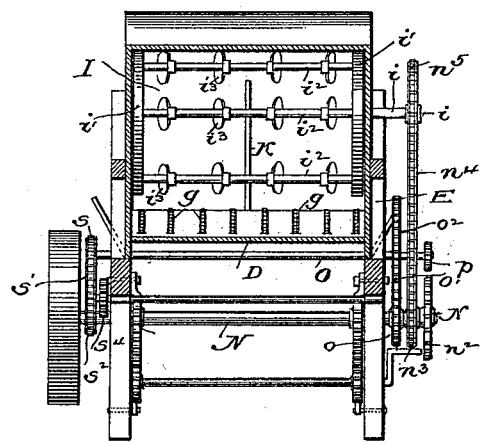
Fig. 5.
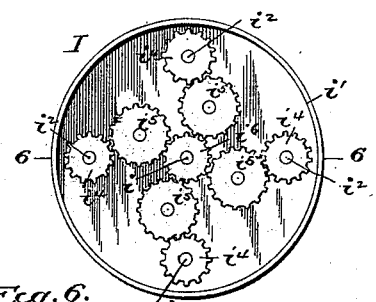
Fig. 6.
on line 6-6
Fig. 7.
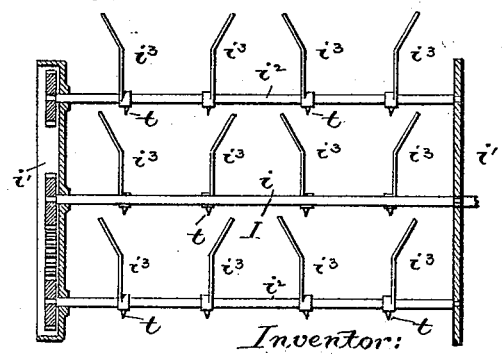
Witnesses:
W. W. Mortimer
H. R. Kennedy
Inventor:
J. W. Rhodes
By his atty Phil. T. Dodge

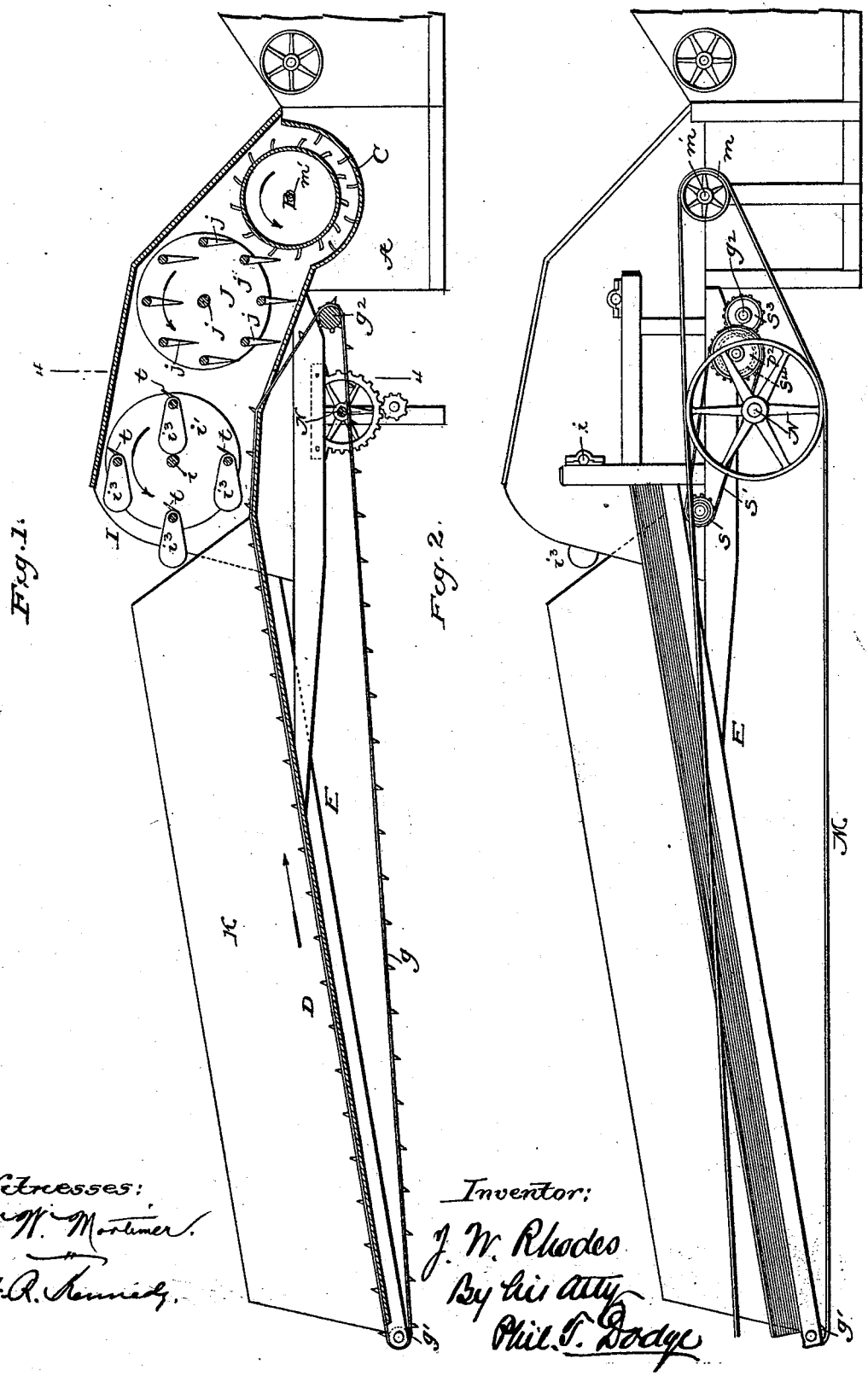

UNITED STATES PATENT OFFICE.

JOHN W. RHODES, OF HAVANA, ILLINOIS, ASSIGNOR TO THE PIONEER THRASHER COMPANY, OF MINNEAPOLIS, MINNESOTA.

BAND-CUTTER AND FEEDER FOR THRASHING-MACHINES.

SPECIFICATION forming part of Letters Patent No. 517,887, dated April 10, 1894.

Application filed January 23, 1891. Serial No. 378,828. (No model.)

*To all whom it may concern:*

Be it known that I, JOHN W. RHODES, of Havana, in the county of Mason and State of Illinois, have invented certain Improvements in Band-Cutters and Feeders for Thrashing-Machines, of which the following is a specification.

My invention relates to that class of mechanisms which are used for cutting the bands of the sheaves, separating the grain, and delivering the same to the thrashing devices, and consists in an improved construction and arrangement of the rotary band-cutting and grain-separating knives, and in various improvements relating to the feeding mechanism.

In the accompanying drawings, Figure 1 is a longitudinal vertical section through the receiving end of a thrashing machine, and through my feeder arranged in connection therewith. Fig. 2 is a side elevation of the same showing the driving connections. Fig. 3 is an elevation from the opposite side intended mainly to show the driving connections. Fig. 4 is a section on the line 4—4 of Fig. 1. Fig. 5 is an end view of the cutting cylinder. Fig. 6 is a longitudinal section of the same on the line 6—6. Fig. 7 is a perspective view showing the form of the band-cutting and spreading blades.

Referring to the drawings,—A represents the receiving end of the thrasher-frame; B, a horizontal toothed thrashing cylinder, and C, the toothed concave thereunder. These parts may all be constructed and arranged to operate in any ordinary manner.

D represents an inclined feed table tending downward to the front edge of the concave and serving as a support upon which to feed the grain endwise to the cylinder.

E represents a frame, which may be of any suitable construction and supported in any suitable manner, adapted to sustain the conveyer-frame, in which there is mounted an endless toothed conveyer. This conveyer may be in the form of an apron, but consists preferably, as shown, of a series of parallel toothed chains, $g$, extending lengthwise of the frame, around a supporting roll, $g'$, at one end, and a shaft, $g^2$, at the opposite end carrying sprocket wheels. The conveyer chains are carried along the top of the frame F, and thence over the forward part of the feed table D, through which they disappear in a downward direction a short distance in advance of the thrashing cylinder, so that they act to carry the grain forward with a positive motion until it arrives within reach of the cylinder.

At a short distance in advance of the thrashing cylinder I mount above the table and conveyer a transverse rotary cutter and spreader, I. This consists of a central shaft, $i$, carrying at its ends disks $i'$, which in turn carry near their outer edges a series of cross-shafts, $i^2$, each provided with a number (usually four) of cutting and spreading blades, $i^3$. These blades consist each of a sheet of steel secured rigidly upon the supporting shaft, its outer end being widened, made of semi-circular form and bent to one side at an angle of about thirty three degrees. Each blade is beveled or sharpened along one or both of its edges that it may act as a knife or cutter to sever the grain bands. The cutting edges are preferably serrated after the manner of a sickle. As the disks revolve carrying with them the shafts, the knives are carried around so as to act in succession with downward and forward strokes upon the grain which is advanced endwise toward the cylinder. As the knives act in rapid succession their edges are certain to sever the band and release the grain while their laterally bent or curved ends serve to open or spread out the grain in the form of a sheet so that it may pass to the thrashing cylinder uniformly from one of its ends to the other.

In order to control the position of the knives as they act upon the grain I propose to combine with their carrying shafts mechanism of any suitable character to maintain them in a horizontal or other desired position, and I recommend for this purpose the system of planetary gears represented in Figs. 5 and 6, in which $i^4$ represents the planetary pinions mounted on the ends of the shafts and connected through idle pinions $i^5$, with the non-rotating central pinion, $i^6$. This system of gears prevents the rotation of the shafts $i^2$ about their axes, and thus maintains the angular position of the knives without interfering with their orbital motion. In place of this gearing which is commonly used in hay tedders, paddle-wheels and other structures to secure the so called feathering action, I may substitute any other arrangement of devices which will control the action of the shafts and knives in like manner. Various combinations for this purpose are known in the art and are therefore to be treated as equivalents of the gearing herein shown when used in connection with my system of revolving knives.

While I prefer to bend the blades laterally as above described that they may act to scatter or spread the grain laterally it is to be understood that this is not a necessary feature but that the knives may be varied in form at will provided they are mounted to operate in the manner described.

Between the rotary cutter and the thrashing cylinder I mount a rotary feeder, J, having a series of vertical feeding teeth, $j$, mounted on shafts in rotary disks $j'$, and controlled by a system of planet gears identical with those used in the cutting cylinder. These teeth standing constantly in a vertical or substantially vertical position descend into the loose grain as it passes beyond the cutter and moves therewith toward the thrashing cylinder. The rotation of the feeder is effected and controlled by driving devices hereinafter described or any other suitable driving devices which will maintain a speed less than that of the thrashing cylinder so that the teeth of the feeder act to retard or hold back the grain against the pulling influence of the cylinder, and this to the end that the teeth of the cylinder may act with a combing or stripping effect as more fully explained in my application for Letters Patent filed on the 25th day of June, 1890, Serial No. 356,671.

In order to insure a more uniform delivery of the grain to the cutting and feeding devices and to insure its presentation endwise to the thrashing cylinder I mount lengthwise over the center of the conveyer $g$, a stationary division-board, K, clearly represented in Fig. 4. The conveyer is of such width that the sheaves may be received one on each side of this board.

The operation of the parts is as follows: The sheaves being placed upon the conveyer are carried forward by its teeth and presented to the action of its revolving cutter I. The blades acting with a downward and forward movement sever the bands and spread the grain laterally upon the conveyer. The grain being thus spread is carried forward by the joint action of the knives and the underlying conveyer within reach of the teeth, $j$, of the feeder. Advancing beneath the feeder and over the table D, the grain is presented endwise to the thrashing cylinder, its advance being checked or retarded in the manner before described so that the cylinder acts in an efficient and rapid manner thereon. The chain conveyer is usually but not necessarily driven so as to advance its teeth at the same or practically the same speed as the teeth of the rotary feeder so that the two sets of teeth act jointly, above and below the grain, carrying the latter forward steadily and positively toward the thrashing cylinder while at the same time they prevent it from being drawn forward at an excessive speed. There is at times a tendency of the grain to accumulate between the rotary cutter and the rotary feeder. To prevent this accumulation of the grain I provide the shaft of the cutter with projecting pins or teeth $t$, which serve to lift the surface grain and return it over the top of the cutter to the front of the machine whence it is returned under the cutter to the feeder. As the cutter is rotated at a high speed the teeth of the underlying, slowly-moving conveyer hold the grain in check and prevent it from being driven forward too rapidly by the knives. The result is a more efficient action of the knives in severing the bands and in opening or spreading out the grain.

It will be observed that the knives of the cutter rotate in parallel planes so that two or more knives may act simultaneously or successively on each band at different points. This not only insures the severance of the band but secures its division at several points so that the grain is permitted to spread freely.

Driving connections of any suitable character which will be suggested by the skill and experience of the mechanic may be used to impart motion to the various parts but I prefer to make use of the connections shown in the drawings.

M represents the main driving belt, extending from the engine or other source of power directly to pulley $m$ on the shaft $m'$, of the thrashing cylinder as in Fig. 2. On the opposite end of the cylinder shaft $m'$, a pulley $n$ is mounted and connected by chain $n'$, with pulley $n^2$, on main driving shaft N. The main shaft is provided with pulley $n^3$, connected by chain $n^4$, with pulley $n^5$, on the shaft of the band-cutter. The main shaft N is also provided with pulley $o$ connected by belt $o'$ with pulley $o^2$ on counter shaft O. This shaft O carries pulley $p$, from which chain $p'$, leads to pulley $p^2$, on the shaft of the rotary feeder. The counter-shaft O also carries a pulley $s$, connected by chain $s'$, to pulley $s^2$ fixed on the shaft of a gear, $s^3$, which engages gear $s^4$ on the roller $g^2$ of the endless conveyer, in order to drive the latter in the proper direction. The pulley $n^2$, which drives the main-shaft may be mounted loosely thereon and connected therewith through the medium of a centrifugal clutch or speed governor in order to allow the feed mechanism to stop or slow down whenever the speed of the thrashing cylinder falls below a proper limit.

Having thus described my invention, what I claim is—

1. In a feeding and band-cutting mechanism, the combination with a suitable grain support, of a rotary drum or cylinder, cutting blades projecting therefrom radially, and having their outer ends bent laterally at an oblique angle to form spreaders, and means for feathering said blades.

2. The band-cutting and spreading blade having its body portion formed with a cutting edge and its end beyond the edge bent laterally to an oblique position, as described and shown.

3. In combination with the rotary cutter having the feathering blades, the thrashing cylinder, the rotary feeder provided with feathering teeth and located between the cutter and cylinder, the conveyer arranged to carry the grain beneath the cutter to the feeder, and the feed table over which the grain is delivered from the feeder to the cylinder.

4. In combination with a thrashing cylinder, the rotary toothed feeder, the rotary band-cutter in advance of the feeder, the toothed conveyer extending beneath the cutter and feeder and mechanism whereby the cutter and thrashing cylinder are driven at high speeds and the feeder and conveyer driven at slower and substantially equal speeds.

5. In combination with the rotary toothed feeder, the underlying toothed conveyer, and the rotary cutter provided with pins or teeth to return the excess of grain to the front of the machine.

In testimony whereof I hereunto set my hand, this 19th day of December, 1890, in the presence of two attesting witnesses.

JNO. W. RHODES.

Witnesses:
ISAAC N. MITCHELL,
H. W. LINDLEY.